United States Patent [19]

Stein

[11] 4,440,510

[45] Apr. 3, 1984

[54] PYROMETRIC GAS TEMPERATURE MEASUREMENT SYSTEM

[75] Inventor: Alexander Stein, Secaucus, N.J.

[73] Assignee: Exxon Research and Engineering Co., Florham Park, N.J.

[21] Appl. No.: 416,291

[22] Filed: Sep. 9, 1982

Related U.S. Application Data

[63] Continuation-in-part of Ser. No. 324,973, Nov. 25, 1981.

[51] Int. Cl.³ .......................... G01K 7/00; G01J 5/16
[52] U.S. Cl. .................................. 374/169; 219/497; 374/129; 374/132
[58] Field of Search ............... 374/129, 121, 124, 164, 374/2, 132, 135; 219/497; 356/40, 43, 44

[56] References Cited

U.S. PATENT DOCUMENTS

| | | | |
|---|---|---|---|
| 1,232,408 | 7/1917 | Thuing | 374/129 X |
| 2,583,293 | 1/1952 | Donna | 374/141 X |
| 2,785,860 | 3/1957 | Harrison et al. | 374/129 X |
| 3,057,200 | 10/1962 | Wood | 356/43 X |
| 3,077,539 | 2/1963 | Blau, Jr. et al. | 374/2 X |
| 3,461,290 | 8/1969 | Webb | 374/132 X |
| 3,475,013 | 10/1969 | Fog | 374/129 X |
| 3,694,624 | 9/1972 | Buchta | 3274/2 X |
| 4,144,758 | 3/1979 | Roney | 374/132 X |

OTHER PUBLICATIONS

"Flames", A. G. Gaydon and H. G. Wolfhard, pp. 268–290.
"Generalized Method Predicts Fired-Heater Performance", *Chemical Engneering*, May 22, 1978, N. Wimpress, C. F. Braun & Co., pp. 95–102.
Henning & Tingwaldt, Z. Phys., 48, 805 (1928).

*Primary Examiner*—Daniel M. Yasich
*Attorney, Agent, or Firm*—Ronald D. Hantman

[57] ABSTRACT

The present invention is a system and method for remotely measuring the temperature of hot gases in fired furnaces. This is achieved by adjusting the physical temperature of a black body until it equals the radiation temperature of the black body as determined by a pyrometer viewing the black body through the hot gases.

8 Claims, 3 Drawing Figures

PYROMETRIC GAS TEMPERATURE MEASUREMENT SYSTEM

This application is a continuation-in-part of U.S. Ser. No. 324,973, filed Nov. 25, 1981.

BACKGROUND OF THE INVENTION

The present invention relates to a system for remotely measuring the average temperature of hot gases. In particular, the invention relates to hot gases in fired furnaces.

The flue gas temperature in the transition zone between radiant and convection section of a fired furnace (frequently called the Bridgewall temperature) is a relative measure of the heat release in the radiant section. In order to maintain a proper balance of heat release between radiant and convection section and also to protect the metal tubes in the convection section from overheating, one must monitor the flue gas temperature in the transition zone. Generally, this is done by thermocouples at the refractory wall near the transition zone. While this measurement gives some indication of gas temperature, a direct measurement of the flue gas temperature in the transition zone, averaged over the length of the furnace, is preferable.

SUMMARY OF THE INVENTION

The present invention is a system and a method for remotely measuring the temperature of hot gases. In a preferred embodiment, the hot gases are the flue gases in fired furnaces. The system includes a black body placed on one side of the furnace and a spectral pyrometer viewing the black body from the opposite wall across the hot flue gas. A means for heating the black body and measuring its temperature independent of the pyrometer are included in the system. The temperature of the black body is increased until the physical temperature of the black body as measured by the independent means is the same as the radiation temperature read by the pyrometer through the flue gas. At this point, the temperature of the gas is necessarily the same as the temperature measured by the pyrometer.

DESCRIPTION OF THE PREFERRED EMBODIMENTS

For the purposes of description, the present invention shall be illustrated and described with respect to the monitoring of the bridgewall temperature of fired furnaces (the temperature of the flue gas at the transition zone between radiant and convection section). The invention described here involves a pyrometer which reads the apparent temperature of a black body across the furnace, i.e., through the hot flue gas. The radiation received by the pyrometer consists of two components, the black body radiation, attenuated by absorption in the flue gas and radiative emission by the hot flue gas itself.

Gas absorptivity equals emissivity and the measured radiation temperature, $T_2$, can be related to the physical temperature of the black body $T_1$, the gas temperature $T_g$ and the gas emissivity (which equals absorptivity) $\alpha$, as $$[\exp(h\nu/kT_2)-1]^{-1} = (1-\alpha)[\exp(h\nu/kT_1)-1]^{-1} + \alpha[\exp(h\nu/kT_g)-1]^{-1}$$

where h is Planck's constant, k is Boltzmann's constant and $\nu$ is the optical frequency of the spectral pyrometer. To obtain the gas temperature, $T_g$, one has to adjust the physical temperature of the black body $T_1$, until it equals the measured radiation temperature, $T_2$. It then follows that if $T_1 = T_2$, then $T_1$ is also equal to $T_g$.

The equation above applies strictly to the case of uniform gas temperature and emissivity along the line connecting pyrometer and black body. In actual installations, the flue gas temperature varies across the furnace. In that case, the measured gas temperature represents a weighted average value. The gas temperature typically rises from some value near the refractory wall to a maximum in the center and falls off again toward the opposite wall. The weighted average that results from the above measurement deviates somewhat from the (calculated) unweighted average. This deviation can be negative or positive depending on the value of $\alpha$. By selecting a proper wavelength band for the pyrometer, one can choose a value of $\alpha$ that minimizes the averaging error.

If the gas is optically very dense, ($\alpha \sim 1$), the black body radiation is essentially blocked, and the measured temperature is that of a portion of the flue gas closest to the pyrometer. At the other extreme of a very thin optical density ($\alpha << 1$) the radiative contribution of the flue gas is negligible and the observed black body radiation is essentially uneffected by the flue gas. The spectral emissivity of flue gas is dominated by the absorption bands of hot $CO_2$ and $H_2O$ vapor, and exhibits strong variations with wavelength. The operating wavelength for the spectral pyrometer therefore should be chosen according to the absorption spectra of hot $CO_2$ and $H_2O$ vapor to yield a flue gas emissivity within the range of 0.1 and 0.9 at the chosen wavelength (wave number). A preferred value is about $1/e = 0.37$. Relevant spectra are available for instance from NASA publication SP-3080.

Figure 3:
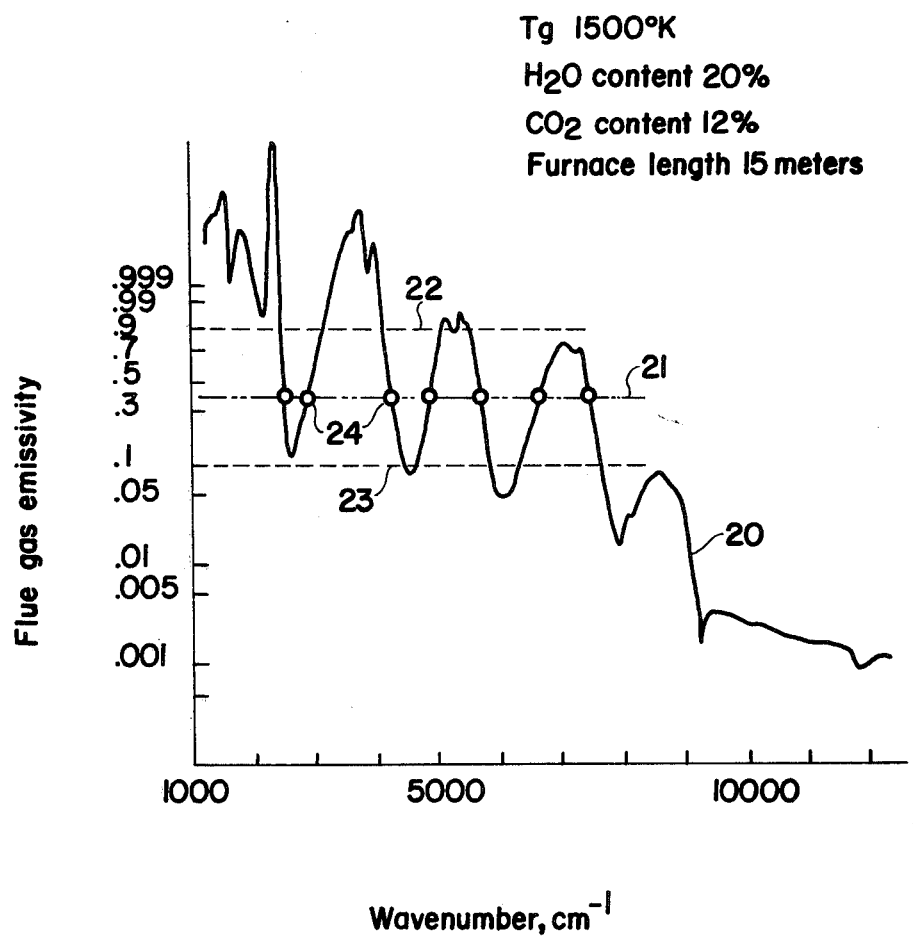
FIG. 3 shows a plot of the spectral emissivity of flue gas from a pyrolysis furnace.

FIG. 3 shows a plot of flue gas emissivity as a function of wave number for the particular example of a pyrolysis furnace. Such furnaces are used throughout the petroleum industry. Preferably the narrow spectral receiving band of the pyrometers should be substantially centered at any one of the wavelengths corresponding to the intersects of the emissivity curve 20 with the $1/e$ emissivity line 21 as indicated by the open circles 24. Lines 22 and 23 correspond to the 0.1 and 0.9 emissivity values representing the limits for the useful range of operating wavelength.

Figure 1:
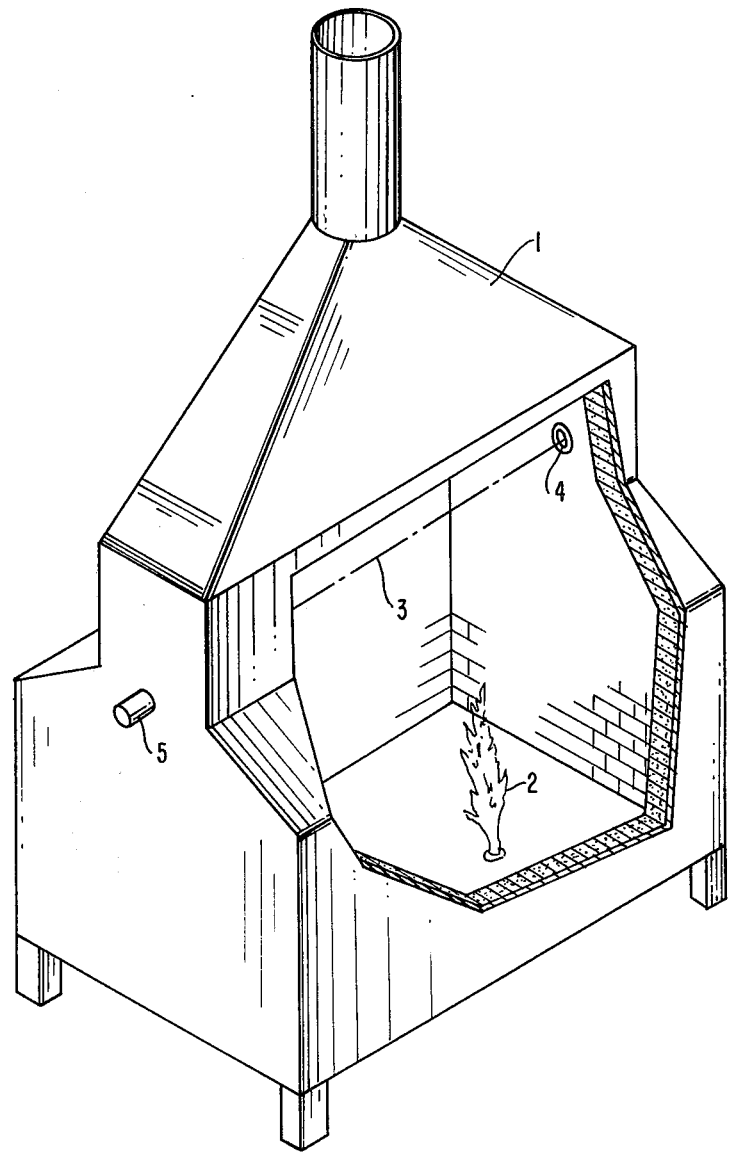
FIG. 1 illustrates a typical arrangement for this invention.

The black body as well as the spectral pyrometer can be constructed in a variety of different ways. FIG. 1 illustrates a typical installation using the present invention. A typical furnace 1 is shown whose flames 2 produce flue gases whose temperature is to be measured along a line 3 through the furnace. A black body 4 is viewed along line 3 through the flue gases by a spectral pyrometer 5. The furnace wall interior is a refractory material such as brick 10 bounded by a steel wall 19.

A preferred design for the black body 4 is a hollow conical or cylindrical structure made from heavily oxidized and rough-surfaced furnace steel. This device is fixed to the furnace wall 10. Being fixed to the interior furnace wall 10 allows the black body to be heated radiatively and convectively by the hot flue gas and conductively by the refractory wall up to a temperature to within about 100 degrees below the gas temperature. In many practical cases, the black body may even approach about 10° C. below the gas temperature. By providing additional heating, say via electrical heater elements, one can bring the blackbody temperature up to that of the gas as required. The temperature of the black body is measured independently of the pyrometer by, for example, a thermocouple or a resistance thermometer.

Figure 2:
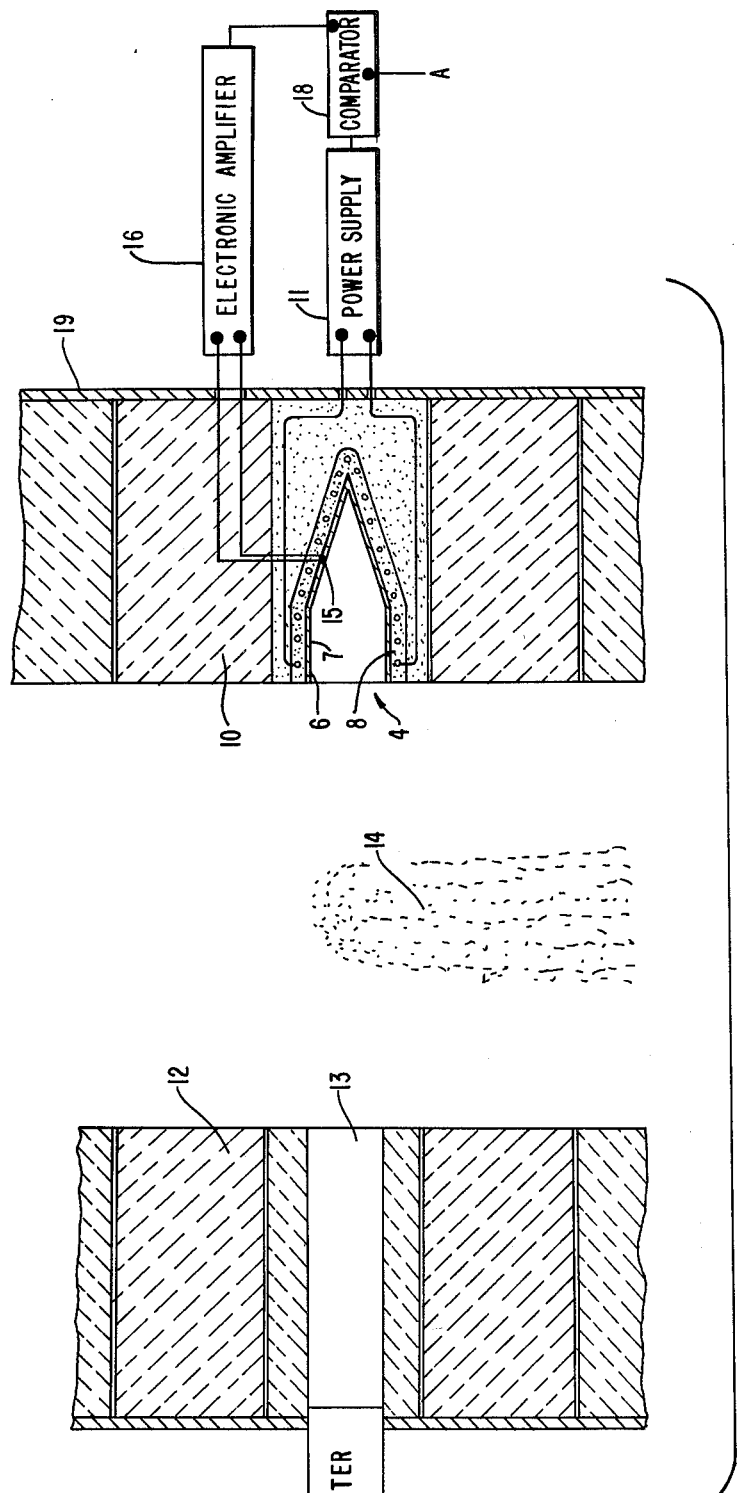
FIG. 2 illustrates the components of a typical system in detail.

FIG. 2 shows the components of a typical system in detail. The black body 4 consists of an inner shell of furnace steel 6 formed as a cone with cylindrical extension surrounded by a heating blanket, a Nichrome winding 7 embedded in heat-resistant cement 8. The black body is surrounded by a packing of kao-wool 9 for thermal insulation and placed into the refractory wall 10. The Nichrome windings 7 are connected to a controlled power supply 11. The spectral pyrometer 5 is positioned at the opposite furnace wall 12 viewing the black body through a hole 13 in the refractory wall 12 across the hot flue gas 14. The temperature of the black body 4, $T_1$, is measured by thermocouples 15 which are welded to the inner shell 6. The radiation received by the spectral pyrometer 5 is converted via the Planck formula into an equivalent temperature $T_2$. Digital signals proportional to $T_1$ and $T_2$ are generated in electronic units 16 and 17, respectively and sent to the digital comparator 18, which sends a control signal (proportional to the temperature difference ($T_2-T_1$) to the power supply 11. As long as $T_1 < T_2$ the power supply 11 is activated such that current runs through the Nichrome windings 7 heating the black body 4 until $T_1 = T_2$. At that point $T_1$ is also equal to the gas temperature, $T_g$.

What is claimed is:

1. A system for remotely measuring the line averaged temperature of hot gases in a fired furnace comprising:
   (a) a black body in thermal contact with said gas, wherein said black body is fixed to an interior furnace side wall by means such that it is heated to within 100° C. below said temperature of said hot gases;
   (b) heating means surrounding said black body for adjusting physical temperature of said black body;
   (c) thermometer means in said black body for measuring the physical temperature of said black body;
   (d) a spectral pyrometer means in an opposite side wall viewing said black body through said gas wherein said spectral pyrometer operates at a wavelength where said gas has an emissivity within the range of 0.1 and 0.9; and
   (e) electronic means for comparing the physical temperature of said black body as measured by said thermometer with the radiation temperature measured by said spectral pyrometer to obtain a resultant signal that is used to control said heating means.

2. The system of claim 1 wherein said black body is a hollow cylindrical or conical cavity made from heavily oxidized furnace steel having a rough surface.

3. The system of claim 2 wherein said heating means is an electrical heating element in thermal contact with said steel cavity.

4. The system of claim 1 wherein said spectral pyrometer operates at a wavelength where the hot gas emissivity is about $e^{-1}$.

5. The system of claim 1 wherein said thermometer means is a thermocouple.

6. The system of claim 1 wherein said thermometer means is a resistance thermometer.

7. A method for remotely measuring the temperature of a hot gas in a fired furnace of unknown emissivity comprising:
   (a) fixing a heated black body to an interior side wall of said furnace in thermal contact with said gas, such that said black body is heated to within 100° C. below said temperature of said hot gases;
   (b) measuring the temperature of said black body through the gas with a spectral pyrometer in an opposite side wall, said spectral pyrometer having a selected operating wavelength such that the emissivity of said gas is between 0.1 and 0.9;
   (c) measuring the temperature of the black body independent of said pyrometer;
   (d) heating the black body until its temperature as measured with said spectral pyrometer is about the same as measured by said means independent of said pyrometer; and
   (e) comparing the physical temperature of said black body as measured with the radiation temperature measured by said spectral pyrometer to obtain a resultant signal that controls the heating of said black body.

8. The method of claim 7 wherein said emissivity is about 1/e.

* * * * *